United States Patent [19]

Sugisawa et al.

[11] Patent Number: 4,840,805

[45] Date of Patent: Jun. 20, 1989

[54] PROCESS FOR PREPARING STERILIZED PACKAGED FISH AND PRODUCT THEREOF

[75] Inventors: Ko Sugisawa; Yasushi Matsumura, both of Nara; Hidefumi Okamoto, Osaka; Kumiko Abe, Nara, all of Japan

[73] Assignee: House Food Industrial Co., Ltd., Higashiosaka, Japan

[21] Appl. No.: 35,190

[22] Filed: Apr. 7, 1987

[30] Foreign Application Priority Data

Apr. 16, 1986 [JP] Japan .................................. 61-87697

[51] Int. Cl.$^4$ .......................... A23L 1/325; A23L 3/00
[52] U.S. Cl. ..................................... 426/129; 426/325; 426/407; 426/332; 426/412; 426/402; 426/643
[58] Field of Search ............... 426/129, 412, 643, 402, 426/400, 401, 407, 325, 324, 332

[56] References Cited

U.S. PATENT DOCUMENTS 2,411,736  11/1946  Kleinschmidt ...................... 426/407

FOREIGN PATENT DOCUMENTS

| 2483190 | 12/1981 | France | 426/129 |
|---|---|---|---|
| 51-19157 | 2/1976 | Japan | 426/643 |
| 52-30580 | 8/1977 | Japan | 426/643 |
| 58-149636 | 9/1983 | Japan | 426/332 |
| 58-198270 | 11/1983 | Japan | 426/643 |
| 59-74949 | 4/1984 | Japan | 426/129 |
| 59-166061 | 9/1984 | Japan | 426/643 |
| 59-198957 | 11/1984 | Japan | 426/643 |
| 61-247365 | 11/1986 | Japan | 426/407 |
| 61-260831 | 11/1986 | Japan | 426/129 |
| 805977 | 2/1981 | U.S.S.R. | 426/129 |
| 1382290 | 1/1975 | United Kingdom | 426/643 |
| 1385556 | 2/1975 | United Kingdom | 426/643 |

*Primary Examiner*—Steven Weinstein
*Attorney, Agent, or Firm*—Oblon, Spivak, McClelland, Maier & Neustadt

[57] ABSTRACT

The present invention relates to a container containing broiled fish in which the generation of drips from the fish and softening of the tissues thereof are prevented during a heat sterilizing treatment, and which has excellent qualities with respect to appearance and taste. The invention provides a container containing broiled fish, which comprises hermetically packaging in a container broiled fish which is obtained by broiling dried fish, then subjecting the container to a heat sterilizing treatment.

12 Claims, No Drawings

PROCESS FOR PREPARING STERILIZED PACKAGED FISH AND PRODUCT THEREOF

BACKGROUND OF THE INVENTION (1) Field of the Invention

The present invention relates to a container containing broiled fish in which the generation of drips from the fish and softening of the tissues thereof are prevented during a heat sterilizing treatment, and which has excellent qualities with respect to appearance and taste.

(2) Prior Art

Heat sterilizing treatment has been previously known as a technique of increasing the preservative capability of a food. The inventors of the present invention have specifically limited the food to broiled fish and have concentrated on a technique for increasing the preservative capability thereof by a heat sterilizing treatment.

However, it has been found that when broiled fish obtained by broiling raw fish by a conventional method is subjected to an ordinary heat sterilizing treatment, i.e. when such broiled fish is hermetically packaged in a container and then subjected to a hot-water sterilizing or retort sterilizing treatment, the following problems occur.

The first problem is that, during heat sterilization, water separates from the fish and juices (referred to as "drips" hereinafter) are generated. These drips remain between the fish and the inside of the container, resulting in a deterioration of the dry texture and taste which are required of broiled fish. Another problem is that the tissues of the fish are softened by the heat treatment and the appearance and texture are thus affected, the quality thereof being greatly decreased thereby.

SUMMARY OF THE INVENTION

It is, therefore, a primary object of the present invention to solve the above-described problems and to provide a container containing broiled fish in which the generation of drips from the fish and the softening of the tissues are preferably prevented during a heat sterilizing treatment, and which has excellent qualities with respect to appearance and texture.

As the result of investigations performed with a view to achieving the above object, the inventors have found that, in a container containing broiled fish which is obtained by broiling dried fish, hermetically packaging it in a container, and then subjecting it to a heat sterilizing treatment, almost no drips are generated from the fish during the heat sterilizing treatment, and the broiled fish obtained after the sterilization has meat which is suitably softened, so that it is softer than that obtained by just broiling dried fish and is more like that obtained by broiling raw fish, and has a novel, pleasant taste and texture.

In accordance with the present invention, there is provided a container containing broiled fish comprising hermetically packaging in a container broiled fish which is obtained by broiling dried fish, then subjecting the container to a heat sterilizing treatment.

DESCRIPTION OF THE PREFERRED EMBODIMENTS

The dried fish used in the present invention is obtained by the drying treatment of any kind of fish, for example, sardine, horse mackerel, pacific saury, mackerel, salmon, yellowtail, spanish mackerel, herring, eel, conger eel, flatfish, sea bream, or pollack. The dried fish may be simply dried fish, salted and dried fish or cooked and dried fish. The dried fish may be obtained by salting fish by, for example, soaking the fish in 10% to 30% salt water for between one hour and one night, or by sprinkling salt on fish then drying it. This method can improve the effect of preventing the fish meat from breaking during the subsequent heat sterilization.

It is preferable to prepare the dried fish used in the present invention by drying it so that its water content is specifically 35 wt. % to 82 wt. %, preferably 55 wt. % to 75 wt. %. When the dried fish prepared so as to contain the above-described amount of water is employed, it is possible to prevent the generation of drips and the breaking of the fish meat during the subsequent heat sterilization. In this case, the yield of the dried fish is, for example, 40% to 97%, preferably 60% to 97%.

Although the means of drying fish is not particularly limited, it is preferable to employ, for example, sun drying, hot-air drying, cold-air drying, toast drying, oven drying, or slow drying combined with any of the above drying methods. The above slow drying means is capable of further preventing the generation of drips and the breaking of the fish meat during the heat sterilization.

Any means can be employed for broiling the dried fish, for example, direct heating by a flame or infrared rays may be employed. It is desirable that the fish broiled in the above-described manner has a hardness of 85 g to 1500 g; preferably, 105 g to 1250 g; more preferably 240 g to 850 g. This improves the effect of preventing the generation of drips and the breaking of the fish meat during the heat sterilization.

The above-mentioned hardness of the broiled fish is obtained by the measurement method described below. In other words, the hardness of the broiled fish is measured using a rheometer (produced by Fudo Kogyo Co., Ltd.) by applying a force perpendicular to the muscle fibers of the fish meat of each of samples obtained by cutting broiled fish which has been baked and then cooled at room temperature into 1 cm$^3$ cubes. In this case, the measurement conditions are a plunger diameter of 18 mm, a lift speed of 6 cm/min, and a clearance of 5 mm.

The dried fish or broiled fish may have any form, such as a complete fish (including an eviscerated fish) or a slice obtained by cutting the fish in a suitable manner (half fish or fish fillet). From the point of view of preventing the flow of drips during heat sterilization, it is preferable that the dried fish or broiled fish be a complete fish, or if it is a slice, it is preferable to cut a raw fish into slices, and then dry and broil it, or to cut a dried fish into slices then broil it.

The container containing the broiled fish of the present invention comprises the broiled fish which is obtained by broiling the above-described dried fish and which is placed in a container, sealed therein, then subjected to a heat sterilizing treatment.

As the container used for holding the broiled fish, it is possible to use any container made from a material which can withstand heat during the heat sterilization, for example, nylon, polyester, polyethylene, polyethylene terephthalate, polypropylene, vinyl chloride, vinylidene chloride, aluminum foil, and suitable laminates thereof. The container may have any structure such as a bag, a dish whose upper open end is covered with a film of a cover material, or a dish containing the broiled fish which is received in a bag.

When the broiled fish is to be hermetically packaged in the container, the broiled fish is placed in the container which is then sealed at suitable positions by heat sealing or adhesion. It is preferable that the broiled fish be packaged in the container under vacuum from the viewpoint of improving the sterilization effect during the heat sterilization. It is particularly preferable to conduct vacuum packaging so that the air content is 25% or less, preferably 15% or less, relative to total volume of air and the broiled fish in the container, because the sterilization effect obtained during the heat sterilization is improved, and the effect of preventing the flow of drips from the fish and the breaking of the fish meat during the heat sterilization is also improved.

Finally, the broiled fish hermetically packaged in the container in the above-mentioned manner is subjected to a heat sterilizing treatment to provide the desired container containing broiled fish. Means which can be employed as the heat sterilizing treatment include hot-water heat sterilization, vapor heat sterilization, retort heat sterilization, high-frequency heat sterilization, and combinations thereof. In addition, the heat sterilizing treatment is made under conditions such that, for example, the temperature is 75° C. to 130° C., and in the case of retort heat sterilization, the pressure is 0.8 to 1.7 kg/cm$^2$ (gauge pressure), preferably 1 to 1.5 kg/cm$^2$ (gauge pressure), and the temperature is 115° C. to 130° C., preferably 121° C. to 127° C., for about 5 to 60 minutes. The present invention is particularly effective for retort heat sterilization which is prone to produce the phenomena of water separation and breaking of the broiled fish.

In the container containing broiled fish of the present invention, the generation of drips from the fish and the softening of the tissues are prevented during the heat sterilizing treatment, and the broiled fish obtained after the sterilization is softer than that obtained by just broiling dried fish and is more like broiled fish obtained by broiling raw fish. It has a novel, pleasant taste and texture similar to those of broiled fish, as well as excellent qualities with respect to appearance and texture.

It is thought that the reasons for the achievement of the above effects of the present invention are that, since the broiled fish obtained by broiling dried fish has mutually-conglutinated muscle fibers and dense tissues, the generation of drips from the fish and the softening of the fish meat are prevented during the heat sterilization, and that the broiled fish is heated in an enclosed state during the sterilization so that the taste and the texture specific to broiled fish is imparted to it.

The present invention will be illustrated by the following non-limitative Examples.

EXAMPLE 1

Eviscerated, salted, and dried horse mackerel (obtained by soaking the fish in 15% to 20% salt water for 2 to 3 hours and drying it in the sun, and which has a weight of about 115 g, a water content of about 68 wt. %, and a yield of about 80%) was broiled by direct heating on a medium or low flame to obtain broiled fish. The thus-obtained broiled fish was vacuum-packed in a pouch measuring 250 mm × 150 mm made from PVDC-coated PET/CPP so that the air content was 15% or less, relative to total volume of air and the broiled fish in the container. The packaged broiled fish was then subjected to retort heat sterilizing treatment by a vapor retort at a pressure of 1.5 kg/cm$^2$ and a temperature of 121° C. for 24 minutes to obtain a container containing broiled fish.

The container containing broiled fish obtained in the above manner showed no generation of drips from the fish and no breaking of the fish meat. In addition, when the broiled fish was heated in a microwave oven and eaten after being stored at room temperature for three months, the broiled fish had a pleasant taste and texture similar to those of broiled fish.

EXAMPLE 2

Except that eviscerated, salted, and dried pacific saury (obtained by soaking the fish in 5% to 20% salt water for 2 to 3 hours and drying it in the sun, and which had a weight of about 120 g, a water content of about 60 wt. %, and a yield of about 93%) was used as the dried fish, and that a pouch measuring 50 mm × 150 mm made from PVDC-coated PET/CPP was used as the container, a container containing broiled fish was obtained by the same method as that of Example 1.

The container containing broiled fish obtained in the above manner showed no generation of drips from the fish and no breaking of the fish meat. In addition, when the broiled fish was heated in a microwave oven and eaten after being stored at room temperature for three months, the broiled fish had a pleasant taste and texture similar to those of broiled fish.

EXAMPLE 3

Broiled fish obtained by baking eviscerated, salted, and dried horse mackerel in the same manner as that of Example 1 was vacuum-packaged in a pouch of 250 mm × 150 mm made from PVDC-coated PET/CPP so that the air content was 15% or less, then was subjected to hot-water sterilization at 95° C. for 25 minutes to provide a container containing broiled fish.

The container containing broiled fish obtained in the above manner showed no generation of drips from the fish and no breaking of the fish meat. In addition, when the broiled fish was heated with boiling water and eaten after being stored in a refrigerator (at 5° C.) for 20 days, the broiled fish had a pleasant taste and texture similar to those of broiled fish.

What is claimed is:

1. A packaged fish product prepared by a process comprising:
   drying a fish selected from the group consisting of sardine, horse mackerel, pacific saury, mackerel, salmon, yellowtail, spanish mackerel, herring, eel, conger eel, flatfish, sea bream and pollack to a water content of 35 to 82 wt.%;
   broiling the dried fish until it has a hardness ranging from 105 to 1250 g;
   hermetically packaging said broiled fish; and heat sterilizing the packaged fish.

2. The packaged fish product according to claim 1, wherein the dried fish is obtained by a drying treatment using a drying means selected from the group consisting of sun drying, hot-air drying, cold-air drying, toast drying, and oven drying.

3. The packaged fish product according to claim 1, wherein the dried fish is dried fish or salted and dried fish or cooked and dried fish.

4. The packaged fish product according to claim 3, wherein the salted and dried fish is obtained by soaking raw fish in 10% to 30% salt water for between 1 hour and 1 night and then drying the soaked fish.

5. The packaged fish product according to claim 3, wherein the salted and dried fish is obtained by scattering salt on raw fish and then drying the salted fish.

6. The packaged fish product according to claim 1, wherein the yield of the dried fish after sterilization is 40% to 97%.

7. The packaged fish product according to claim 1, wherein the broiled fish is a complete fish.

8. The packaged fish product according to claim 1, wherein the broiled fish is obtained by cutting a raw fish into slices, and drying and broiling the slices of fish.

9. The packaged fish product according to claim 1, wherein the broiled fish is obtained by cutting a dried fish into slices and then broiling the slices.

10. The packaged fish product according to claim 1, wherein the heat sterilizing treatment is a retort heat sterilizing treatment.

11. A process for preparing a packaged fish product, comprising:
   drying a fish selected from the group consisting of sardine, horse mackerel, pacific saury, mackerel, salmon, yellowtail, spanish mackerel, herring, eel, conger eel, flatfish, sea bream and pollack to a water content of 35 to 82 wt.%;
   broiling and dried fish until it has a hardness ranging from 105 to 1250 g;
   hermetically packaging said broiled fish; and heat sterilizing the packaged fish.

12. The process according to claim 11, wherein the heat sterilizing treatment is a retort heat sterilizing treatment.

* * * * *